Nov. 16, 1926.
F. X. LENK
1,606,881
EAR TAG
Filed May 2, 1925
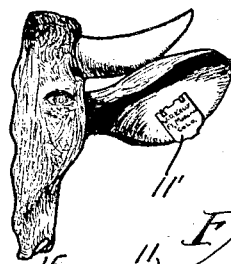
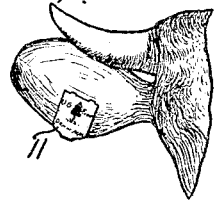
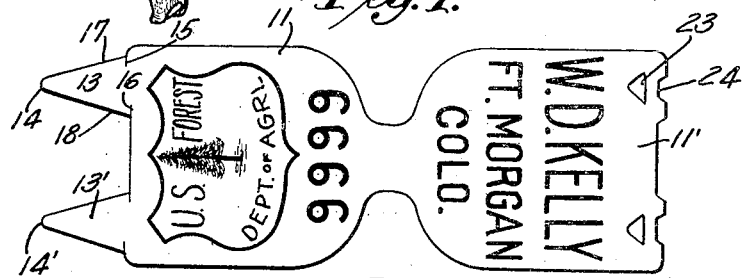
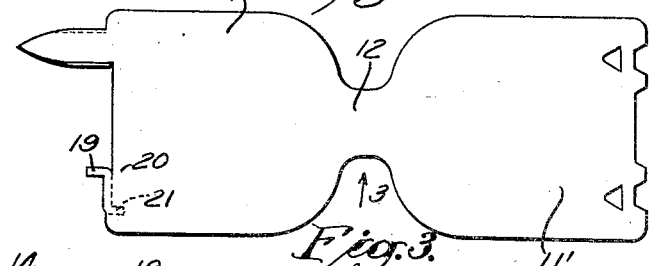
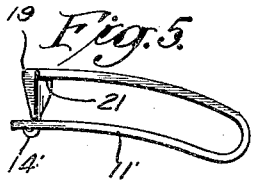
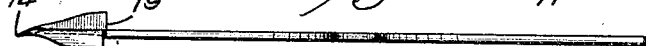
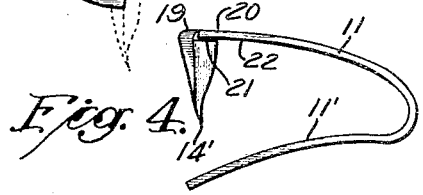
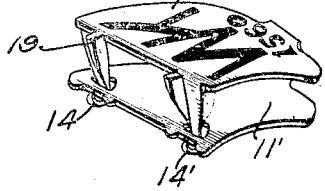
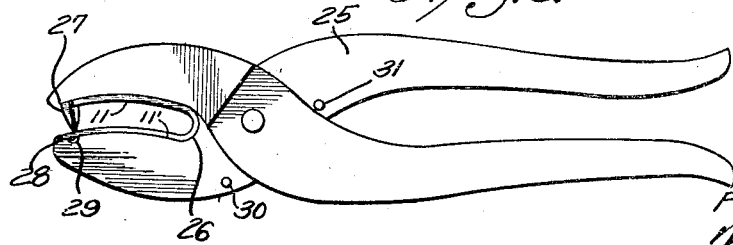
INVENTOR
FRANK X LENK
ATTORNEY Patented Nov. 16, 1926.

1,606,881

UNITED STATES PATENT OFFICE.

FRANK X. LENK, OF LOS ANGELES, CALIFORNIA.

EAR TAG.

Application filed May 2, 1925. Serial No. 27,494.

My present invention being described as relating to ear tags and pliers, it may be understood to be an object of this invention to provide improved metallic tags adapted to be permanently secured to the ears of animals, as a means of indicating, for example, the ownership or the classification or the pedigree or the identity thereof.

It is an object of this invention to provide an ear tag with ear-perforating and tag-retaining tips of an improved form; and, in a preferred embodiment of my invention, I may provide a pair of the mentioned tips at one end of each tag, and said tag may comprise expanded portions adapted to carry easily legible names or legends or other marks; and said expanded portions may be connected by an intermediate portion of less breadth.

It is an object of this invention to provide tags each carrying, at or near one end, a plurality of points suitably spaced apart, and carrying, at or near its opposite end, a corresponding plurality of openings through which the tips of said points may be forced; and, in a preferred embodiment, said points may be provided with edges oppositely bent in such manner as to reinforce the same; and said points may also be provided with one or more shoulders through which pressure may be applied in the forcing of said points through the skin and cartilage of an animal's ear.

Ear tags' points having heretofore been found liable to bend, during an effort to insert the same, and also liable to catch on weeds or brush, after said tags were applied, it is a further object of this invention to provide ear tags with points which are not liable to bend in an unintended manner during their insertion, but which nevertheless comprise tips that can be bent outward, rather than inward, after passing through an animal's ear. For the purpose referred to, I may provide one end of each tag not only with apertures, through which said tips may extend, but with notches into which said tips may be bent; and I may provide the mentioned pliers not only with faces suitable to the retention of said tags, and to the application of pressure to shoulders on said tips, but with means for imparting an outward bend to said tips,—clinching the same into the mentioned notches, in case the latter are provided.

Broadly, it is an object of my present invention to provide tags, and means for applying the same, which shall be superior, in all essential respects, to the devices heretofore in use, including such as are illustrated in my prior United States Patent No. 1,200,-943, granted October 10, 1916.

Other objects of my invention will appear from the following description of advantageous embodiments thereof, taken in connection with the appended claims and the accompanying drawings, in which—

Fig. 1 may be referred to as a plan view of a blank, cut suitably for use in the manufacture of one of my tags, and shown as provided with the name and address of an owner, and with additional marks.

Fig. 2 is a similar view, omitting the features last referred to, and illustrating the sequence of successive steps hereinafter referred to.

Fig. 3 is an edge view, taken substantially as indicated by the arrow 3 of Fig. 2 and showing, in dotted lines, one of a pair of ear-piercing points as bent downward, in a manner hereinafter described.

Fig. 4 is a view corresponding to Fig. 3, but showing a tag in its completed form, ready for insertion into a pair of suitable pliers, for use in applying the same.

Fig. 5 is a view similar to Fig. 4, but showing the effects produced by a suitable application of pressure in applying a tag.

Fig. 6 is a perspective view, corresponding to Fig. 5, and showing a brand name and number different from that illustrated in Fig. 1.

Figs. 7 and 8 are respectively front and rear views of parts of an animal's head, these views being provided primarily to emphasize the comparatively large areas of the expanded body portions of my novel tags, and the facility with which they may be read, even from a considerable distance.

Fig. 9 is an elevational view of a pair of pliers especially suitable for use in the application of my novel tags, but not separately claimed herein.

Referring to the details of that specific embodiment of my invention chosen for purposes of illustration, each of my tags may comprise a pair of expanded body portions 11, 11', shown as connected by a constricted portion 12; and one of the mentioned expanded portions is preferably so cut, as best illustrated in Figs. 1 and 2, as to provide a pair of symmetrically disposed points 13, 13', adapted to be forced through an animal's ear, and to be clinched in such manner as permanently to secure the same.

The tips 14, 14' of the respective points 13, 13' may be provided with cutting edges, to facilitate the penetration of an animal's ear; and, in order to reinforce the said points and to provide for a suitable application of pressure thereto, I may, in an initial blanking operation, or subsequently thereto, provide relatively offset cuts, as at 15 and 16, thereafter bending the respective edges 17 and 18 of each point in opposite directions, substantially as shown in Fig. 2. When the mentioned cutting and bending is properly done, the shoulders 19, formed by the cuts 16, may lie in substantially the same plane as the upper surface 20 of the adjacent body portion 11 of a tag; and shoulders 21, formed by the cuts 15, may project below the lower or inner surfaces 22 thereof, optionally contacting therewith.

At the end of each tag, remote from the described points, I may provide the expanded portions 11' with apertures 23, and optionally also with notches 24, in order that the points 14, 14', after being pressed through an animal's ear, may pass also through said apertures and be outwardly deflected and clinched within the mentioned notches, being secured thereby.

To complete the preparation of my described tags, which may be provided with any desired marks or lettering (either at the time the described blanks are cut or subsequently thereto) each may be bent into substantially the form shown in Fig. 4, adapting the same to be received within the jaws of a pair of pliers 25, such as are shown in Fig. 9. It will be appreciated that the substantially central reduction in diameter at 12 enables my tags to be easily bent into the position shown in Fig. 4, and also adapts the same to be neatly applied to the curved edge of an ear, as illustrated in Figs. 7 and 8. The body of metal to be bent in the application of a tag of the character described is not necessarily greater than in the case of narrower tags heretofore used; but my pliers 25 may be given any dimensions appropriate to the simultaneous forcing of a plurality of points 14, 14' through an animal's ear. The characters shown in Figs. 1 and 6 may be applied to a tag in any preferred manner; but I prefer to assure the legibility thereof by providing suitable depressions and filling the same with an enamel; but no feature of my invention can well be regarded as more important than my described method of cutting and reinforcing and bending the tips 13, 13', and the respective edges, points, and shoulders thereof; and it will be obvious that, in order to adapt my pliers 25 to use therewith, the jaws thereof should be provided not only with suitable curvatures, as at 26, but with suitable notches, as at 27 and 28, and with means, such as a channel 29, outwardly to deflect and clinch the points 14, 14', within the notches 24, as best shown in Fig. 6.

Means such as stop pins 30 and 31 may also be employed, to limit the opening and closing movements of said pliers.

While I have shown and described alternative embodiments of my invention, I am aware that various features thereof may be independently employed and that certain changes and modifications may be made by those skilled in the art to which this case relates, without the slightest departure from the spirit and scope of my invention, as the same is indicated above and in the following claims.

I claim as my invention:

1. An ear tag comprising body portions expanded to carry easily legible marks and connected by a constricted portion adapted to be easily bent, one of said body portions being provided with a plurality of cutting points which are reinforced by oppositely turned edges.

2. A tag comprising expanded body portions respectively provided with a plurality of cutting points reinforced by turning the edges thereof in opposite directions and provided also with a corresponding plurality of apertures to receive said points.

3. A tag comprising a body portion adapted to carry distinguishing marks and provided with a cutting point reinforced by turning the respective edges thereof in opposite directions.

4. A tag comprising a body portion and a cutting point, said cutting point being provided with edges which are respectively bent inward and outward, said edges respectively terminating in shoulders at different levels near the base thereof.

5. A tag comprising a body portion and a cutting point, said cutting point being provided with shoulders at different levels near the base thereof, one of said shoulders extending in substantially the same plane as a surface of said body portion.

6. A tag comprising a body portion and a cutting point, said cutting point being provided with shoulders at different levels near the base thereof, one of said shoulders being adapted to extend forwardly from said body portion, and one of said shoulders being adapted to extend rearwardly thereunder.

7. A tag comprising: a body portion and a cutting point; and a second body portion, formed integral with said first named body portion, said second body portion having an aperture to receive the tip of said cutting point and having also an open notch to receive the forwardly bent end of said tip, said body portions having a constriction therebetween.

8. A tag comprising expanded body portions separated by a central constriction and respectively provided with cutting points and with apertures to receive said points; shoulders at different levels on said points, to transmit pressure through rebent reinforcing portions thereof; and means to receive and secure the forwardly bent tips of said points, when said tag is attached by an application of pressure through said shoulders.

In testimony whereof, I have hereunto set my hand at Los Angeles, California, this 20th day of April, 1925.

FRANK X. LENK.